(12) United States Patent
Delker et al.

(10) Patent No.: US 11,445,062 B2
(45) Date of Patent: Sep. 13, 2022

(54) TECHNIQUES FOR BEHAVIORAL PAIRING IN A TASK ASSIGNMENT SYSTEM

(71) Applicant: Afiniti, Ltd., Hamilton (BM)

(72) Inventors: Jason Delker, Washington, DC (US); Zia Chishti, Washington, DC (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 16/551,285

(22) Filed: Aug. 26, 2019

(65) Prior Publication Data

US 2021/0067627 A1    Mar. 4, 2021

(51) Int. Cl.
*H04M 3/00* (2006.01)
*H04M 5/00* (2006.01)
*H04M 3/428* (2006.01)
*G06F 16/683* (2019.01)
(Continued)

(52) U.S. Cl.
CPC ........ *H04M 3/4285* (2013.01); *G06F 16/685* (2019.01); *H04M 3/5175* (2013.01); *H04M 3/5183* (2013.01)

(58) Field of Classification Search
CPC ............. H04M 3/5175; H04M 3/5191; H04M 3/42221; H04M 2203/401; H04M 2203/303; H04M 3/51; H04M 2203/301; H04M 3/5166; H04M 3/5183; H04M 3/523; H04M 2201/42; H04M 3/4285; H04M 7/006; H04M 3/42161; H04M 3/493;
(Continued)

(56) References Cited

U.S. PATENT DOCUMENTS 5,155,763 A   10/1992  Bigus et al.
5,206,903 A    4/1993  Kohler et al.
5,327,490 A    7/1994  Cave
(Continued)

FOREIGN PATENT DOCUMENTS

AU    2008349500 C1    5/2014
AU    2009209317 B2    5/2014
(Continued)

OTHER PUBLICATIONS

Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 2016, (11 pages).
(Continued)

*Primary Examiner* — Kharye Pope
(74) *Attorney, Agent, or Firm* — Wilmer Cutler Pickering Hale and Dorr LLP

(57) ABSTRACT

Techniques for behavioral pairing in a task assignment system are disclosed. In one particular embodiment, the techniques may be realized as a method for behavioral pairing in a task assignment system comprising: determining, by at least one computer processor communicatively coupled to and configured to operate in the task assignment system, information about a task waiting for assignment in the task assignment system; and selecting, by the at least one computer processor, a hold activity from a plurality of hold activities for the task based on the information about the task, wherein the selected hold activity is expected to improve performance of the task assignment system.

24 Claims, 3 Drawing Sheets

(51) Int. Cl.
*H04M 3/51* (2006.01)
*H04L 12/66* (2006.01)

(58) Field of Classification Search
CPC ....... H04M 3/5238; H04M 2203/2011; H04M 3/42323; H04M 2201/40
USPC ............ 379/265.09, 265.02, 265.01, 266.01, 379/266.06, 266, 88.18, 265.13, 266.02, 379/68; 370/352, 353, 354
See application file for complete search history.

(56) References Cited

U.S. PATENT DOCUMENTS

| | | | |
|---|---|---|---|
| 5,537,470 | A | 7/1996 | Lee |
| 5,702,253 | A | 12/1997 | Bryce et al. |
| 5,825,869 | A | 10/1998 | Brooks et al. |
| 5,903,641 | A | 5/1999 | Tonisson |
| 5,907,601 | A | 5/1999 | David et al. |
| 5,926,538 | A | 7/1999 | Deryugin et al. |
| 6,014,439 | A * | 1/2000 | Walker .................. H04M 3/428 379/265.02 |
| 6,021,428 | A | 2/2000 | Miloslavsky |
| 6,044,355 | A | 3/2000 | Crockett et al. |
| 6,044,468 | A | 3/2000 | Osmond |
| 6,049,603 | A | 4/2000 | Schwartz et al. |
| 6,052,460 | A | 4/2000 | Fisher et al. |
| 6,064,731 | A | 5/2000 | Flockhart et al. |
| 6,088,444 | A | 7/2000 | Walker et al. |
| 6,163,607 | A | 12/2000 | Bogart et al. |
| 6,222,919 | B1 | 4/2001 | Hollatz et al. |
| 6,292,555 | B1 | 9/2001 | Okamoto |
| 6,324,282 | B1 | 11/2001 | McIllwaine et al. |
| 6,333,979 | B1 | 12/2001 | Bondi et al. |
| 6,389,132 | B1 | 5/2002 | Price |
| 6,389,400 | B1 | 5/2002 | Bushey et al. |
| 6,408,066 | B1 | 6/2002 | Andruska et al. |
| 6,411,687 | B1 | 6/2002 | Bohacek et al. |
| 6,424,709 | B1 | 7/2002 | Doyle et al. |
| 6,434,230 | B1 | 8/2002 | Gabriel |
| 6,496,580 | B1 | 12/2002 | Chack |
| 6,504,920 | B1 | 1/2003 | Okon et al. |
| 6,519,335 | B1 | 2/2003 | Bushnell |
| 6,519,568 | B1 | 2/2003 | Harvey et al. |
| 6,535,600 | B1 | 3/2003 | Fisher et al. |
| 6,535,601 | B1 | 3/2003 | Flockhart et al. |
| 6,570,980 | B1 | 5/2003 | Baruch |
| 6,587,556 | B1 | 7/2003 | Judkins et al. |
| 6,603,854 | B1 | 8/2003 | Judkins et al. |
| 6,639,976 | B1 | 10/2003 | Shellum et al. |
| 6,661,889 | B1 | 12/2003 | Flockhart et al. |
| 6,704,410 | B1 | 3/2004 | McFarlane et al. |
| 6,707,904 | B1 | 3/2004 | Judkins et al. |
| 6,714,643 | B1 | 3/2004 | Gargeya et al. |
| 6,744,878 | B1 | 6/2004 | Komissarchik et al. |
| 6,763,104 | B1 | 7/2004 | Judkins et al. |
| 6,774,932 | B1 | 8/2004 | Ewing et al. |
| 6,775,378 | B1 | 8/2004 | Villena et al. |
| 6,798,876 | B1 | 9/2004 | Bala |
| 6,829,348 | B1 | 12/2004 | Schroeder et al. |
| 6,832,203 | B1 | 12/2004 | Villena et al. |
| 6,859,529 | B2 | 2/2005 | Duncan et al. |
| 6,895,083 | B1 | 5/2005 | Bers et al. |
| 6,922,466 | B1 | 7/2005 | Peterson et al. |
| 6,937,715 | B2 | 8/2005 | Delaney |
| 6,956,941 | B1 | 10/2005 | Duncan et al. |
| 6,970,821 | B1 | 11/2005 | Shambaugh et al. |
| 6,978,006 | B1 | 12/2005 | Polcyn |
| 7,023,979 | B1 | 4/2006 | Wu et al. |
| 7,039,166 | B1 | 5/2006 | Peterson et al. |
| 7,050,566 | B2 | 5/2006 | Becerra et al. |
| 7,050,567 | B1 | 5/2006 | Jensen |
| 7,062,031 | B2 | 6/2006 | Becerra et al. |
| 7,068,775 | B1 | 6/2006 | Lee |
| 7,092,509 | B1 | 8/2006 | Mears et al. |
| 7,103,172 | B2 | 9/2006 | Brown et al. |
| 7,158,628 | B2 | 1/2007 | McConnell et al. |
| 7,184,540 | B2 | 2/2007 | Dezonno et al. |
| 7,209,549 | B2 | 4/2007 | Reynolds et al. |
| 7,231,032 | B2 | 6/2007 | Nevman et al. |
| 7,231,034 | B1 | 6/2007 | Rikhy et al. |
| 7,236,584 | B2 | 6/2007 | Torba |
| 7,245,716 | B2 | 7/2007 | Brown et al. |
| 7,245,719 | B2 | 7/2007 | Kawada et al. |
| 7,266,251 | B2 | 9/2007 | Rowe |
| 7,269,253 | B1 | 9/2007 | Wu et al. |
| 7,353,388 | B1 | 4/2008 | Gilman et al. |
| 7,372,952 | B1 | 5/2008 | Wu et al. |
| 7,398,224 | B2 | 7/2008 | Cooper |
| 7,593,521 | B2 | 9/2009 | Becerra et al. |
| 7,676,034 | B1 | 3/2010 | Wu et al. |
| 7,725,339 | B1 | 5/2010 | Aykin |
| 7,734,032 | B1 | 6/2010 | Kiefhaber et al. |
| 7,798,876 | B2 | 9/2010 | Mix |
| 7,826,597 | B2 | 11/2010 | Berner et al. |
| 7,864,944 | B2 | 1/2011 | Khouri et al. |
| 7,899,177 | B1 | 3/2011 | Bruening et al. |
| 7,916,858 | B1 | 3/2011 | Heller et al. |
| 7,940,917 | B2 | 5/2011 | Lauridsen et al. |
| 7,949,122 | B1 * | 5/2011 | Taylor ................ H04M 3/5238 379/266.1 |
| 7,961,866 | B1 | 6/2011 | Boutcher et al. |
| 7,995,717 | B2 | 8/2011 | Conway et al. |
| 8,000,989 | B1 | 8/2011 | Kiefhaber et al. |
| 8,010,607 | B2 | 8/2011 | McCormack et al. |
| 8,094,790 | B2 | 1/2012 | Conway et al. |
| 8,126,133 | B1 | 2/2012 | Everingham et al. |
| 8,140,441 | B2 | 3/2012 | Cases et al. |
| 8,175,253 | B2 | 5/2012 | Knott et al. |
| 8,229,102 | B2 | 7/2012 | Knott et al. |
| 8,249,245 | B2 | 8/2012 | Jay et al. |
| 8,295,471 | B2 | 10/2012 | Spottiswoode et al. |
| 8,300,798 | B1 | 10/2012 | Wu et al. |
| 8,306,212 | B2 | 11/2012 | Arora |
| 8,359,219 | B2 | 1/2013 | Chishti et al. |
| 8,433,597 | B2 | 4/2013 | Chishti et al. |
| 8,472,611 | B2 | 6/2013 | Chishti |
| 8,565,410 | B2 | 10/2013 | Chishti et al. |
| 8,634,542 | B2 | 1/2014 | Spottiswoode et al. |
| 8,644,490 | B2 | 2/2014 | Stewart |
| 8,670,548 | B2 | 3/2014 | Xie et al. |
| 8,699,694 | B2 | 4/2014 | Chishti et al. |
| 8,712,821 | B2 | 4/2014 | Spottiswoode |
| 8,718,271 | B2 | 5/2014 | Spottiswoode |
| 8,724,797 | B2 | 5/2014 | Chishti et al. |
| 8,731,178 | B2 | 5/2014 | Chishti et al. |
| 8,737,595 | B2 | 5/2014 | Chishti et al. |
| 8,750,488 | B2 | 6/2014 | Spottiswoode et al. |
| 8,761,380 | B2 | 6/2014 | Kohler et al. |
| 8,781,100 | B2 | 7/2014 | Spottiswoode et al. |
| 8,781,106 | B2 | 7/2014 | Afzal |
| 8,792,630 | B2 | 7/2014 | Chishti et al. |
| 8,824,658 | B2 | 9/2014 | Chishti |
| 8,831,207 | B1 | 9/2014 | Agarwal |
| 8,856,869 | B1 | 10/2014 | Brinskelle |
| 8,879,715 | B2 | 11/2014 | Spottiswoode et al. |
| 8,903,079 | B2 | 12/2014 | Xie et al. |
| 8,913,736 | B2 | 12/2014 | Kohler et al. |
| 8,929,537 | B2 | 1/2015 | Chishti et al. |
| 8,938,063 | B1 | 1/2015 | Hackbarth et al. |
| 8,995,647 | B2 | 3/2015 | Li et al. |
| 9,020,137 | B2 | 4/2015 | Chishti et al. |
| 9,025,757 | B2 | 5/2015 | Spottiswoode et al. |
| 9,215,323 | B2 | 12/2015 | Chishti |
| 9,277,055 | B2 | 3/2016 | Spottiswoode et al. |
| 9,300,802 | B1 | 3/2016 | Chishti |
| 9,426,296 | B2 | 8/2016 | Chishti et al. |
| 9,712,676 | B1 | 7/2017 | Chishti |
| 9,712,679 | B2 | 7/2017 | Chishti et al. |
| 9,781,269 | B2 | 10/2017 | Chishti et al. |
| 9,787,841 | B2 | 10/2017 | Chishti et al. |
| 9,930,180 | B1 | 3/2018 | Kan et al. |
| 9,942,405 | B1 | 4/2018 | Kan et al. |
| RE46,986 | E | 8/2018 | Chishti et al. |
| 10,135,987 | B1 | 11/2018 | Chishti et al. |

(56) References Cited

U.S. PATENT DOCUMENTS

| | | |
|---|---|---|
| RE47,201 E | 1/2019 | Chishti et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129187 A1* | 6/2005 | Agapi ............... H04M 3/4285 379/76 |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0004384 A1* | 1/2007 | Anupam ............. H04M 3/4285 455/414.1 |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0107245 A1* | 5/2008 | Yoo .................... H04M 3/5166 379/88.18 |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0013765 A1* | 1/2011 | Hartman ................ H04M 3/51 379/265.06 |
| 2011/0022357 A1 | 1/2011 | Vock et al. |
| 2011/0031112 A1 | 2/2011 | Birang et al. |
| 2011/0051908 A1* | 3/2011 | Garner ................ G06Q 30/02 379/88.04 |
| 2011/0069821 A1 | 3/2011 | Korolev et al. |
| 2011/0125048 A1 | 5/2011 | Causevic et al. |
| 2011/0129072 A1* | 6/2011 | Knapp ................ H04M 3/436 379/88.13 |
| 2011/0206199 A1 | 8/2011 | Arora |
| 2011/0264508 A1* | 10/2011 | Harik ................ G06Q 30/0277 705/14.42 |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2012/0300917 A1* | 11/2012 | Commarford ...... H04M 3/4285 379/207.03 |
| 2013/0003959 A1 | 1/2013 | Nishikawa et al. |
| 2013/0028396 A1* | 1/2013 | Pasi .................... H04M 3/523 379/67.1 |
| 2013/0051545 A1 | 2/2013 | Ross et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0032746 A1* | 1/2015 | Lev-Tov ............. G06F 16/2465 707/737 |
| 2015/0055772 A1 | 2/2015 | Klemm et al. |
| 2015/0281448 A1 | 10/2015 | Putra et al. |
| 2016/0050312 A1* | 2/2016 | Ronketti ............ H04M 3/4285 455/414.1 |

(56) References Cited

U.S. PATENT DOCUMENTS

| | | | |
|---|---|---|---|
| 2016/0080573 A1 | 3/2016 | Chishti | |
| 2017/0013131 A1 | 1/2017 | Craib | |
| 2017/0064080 A1 | 3/2017 | Chishti et al. | |
| 2017/0064081 A1 | 3/2017 | Chishti et al. | |
| 2017/0185945 A1* | 6/2017 | Matula | G06Q 10/063114 |
| 2017/0264744 A1* | 9/2017 | Conway | H04L 67/10 |
| 2017/0316438 A1* | 11/2017 | Konig | G06Q 30/016 |
| 2018/0103149 A1* | 4/2018 | Skiba | H04L 51/02 |
| 2021/0217413 A1* | 7/2021 | Tushinskiy | H04M 3/4878 |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |
| EP | 1335572 A2 | 8/2003 |
| EP | 2338270 B1 | 6/2011 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-069168 A | 3/2002 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514268 A | 5/2015 |
| JP | 2015-514371 A | 5/2015 |
| KR | 10-2002-0044077 A | 6/2002 |
| KR | 10-2013-0099554 A | 9/2013 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2011-500868 | 5/2010 |
| PH | 1-2010-501704 | 2/2014 |
| PH | 1-2010-501705 | 2/2015 |
| WO | WO-1999/017517 A1 | 4/1999 |
| WO | WO-00/70849 A2 | 11/2000 |
| WO | WO-2001/063894 A2 | 8/2001 |
| WO | WO-2006/124113 A2 | 11/2006 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2015/019806 A1 | 2/2015 |
| WO | WO-2016/048290 A1 | 3/2016 |

OTHER PUBLICATIONS

Anonymous, (2006) "Performance Based Routing in Profit Call Centers," The Decision Makers' Direct, located at www.decisioncraft. com, Issue Jun. 2002, (3 pages).

Australian Examination Report No. 2 issued in Australian Patent Application No. 2018206837, dated Jan. 16, 2019, (6 pages).

Canada Office Action issued in Canadian Patent Application No. 2713526, dated Oct. 19, 2017, (6 pages).

Canada Office Action issued in Canadian Patent Application No. 2713526, dated Oct. 25, 2016, (7 pages).

Canada Office Action issued in Canadian Patent Application No. 2993380, dated Nov. 27, 2018, (5 pages).

Canada Office Action issued in Canadian Patent Application No. 3028696, dated Jan. 23, 2019, (6 pages).

Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).

China Notification of First Office Action issued in Chinese Patent Application No. 201680070038.3, dated Nov. 26, 2018, (26 pages).

Cleveland, William S., "Robust Locally Weighted Regression and Smoothing Scatterplots," Journal of the American Statistical Association, vol. 74, No. 368, pp. 829-836 (Dec. 1979).

Cormen, T.H., et al., "Introduction to Algorithms", Third Edition, Chapter 26 and 29, 2009, (116 pages).

European Communication Pursuant to Rule 164(2)(b) and Article 94(3) EPC issued in European Patent Application No. 09752022.5, dated Dec. 18, 2015, (7 pages).

European Extended Search Report issued by the European Patent Office for European Patent Application No. 18168620.5 dated Jun. 12, 2018, (9 pages).

European Extended Search Report issued by the European Patent Office for European Patent Application No. 18201848.1 dated Nov. 9, 2018, (8 pages).

European Extended Search Report issued by the European Patent Office for European Patent Application No. 18201856.4 dated Nov. 14, 2018, (8 pages).

European Extended Search Report issued by the European Patent Office for European Patent Application No. 18202932.2 dated Nov. 22, 2018, (8 pages).

European Extended Search Report issued by the European Patent Office for European Patent Application No. 18211624.4 dated Mar. 20, 2019, (9 pages).

European Extended Search Report issued by the European Patent Office for European Patent Application No. 18211783.8 dated Mar. 21, 2019, (9 pages).

European Extended Search Report issued by the European Patent Office for European Patent Application No. 18212022.0 dated Mar. 29, 2019, (10 pages).

European Extended Search Report issued by the European Patent Office for European Patent Application No. 19155459.1 dated Feb. 28, 2019, (8 pages).

Extended European Search Report issued by the European Patent Office for European Patent Application No. 17154781.3 dated May 4, 2017, (7 pages).

Extended European Search Report issued by the European Patent Office for European Patent Application No. 17171761.4 dated Aug. 30, 2017, (8 pages).

Gans, N. et al., "Telephone Call Centers: Tutorial, Review and Research Prospects," Manufacturing & Service Operations Management, vol. 5, No. 2, 2003, pp. 79-141, (84 pages).

India Examination Report issued in India Patent Application No. 7583/CHENP/2014, dated Jun. 27, 2019, 7 pages.

India Examination Report issued in Indian Patent Application No. 3748/CHENP/2011, dated Feb. 1, 2018, (7 pages).

(56) References Cited

OTHER PUBLICATIONS

International Preliminary Report on Patentability and Written Opinion issued in connection with PCT/US2009/066254 dated Jun. 14, 2011, (6 pages).
International Search Report and Written Opinion issued by the European Patent Office as International Searching Authority for PCT/IB2016/001762 dated Feb. 20, 2017, (15 pages).
International Search Report and Written Opinion issued by the European Patent Office as International Searching Authority for PCT/IB2016/001776 dated Mar. 3, 2017, (16 pages).
International Search Report and Written Opinion issued by the European Patent Office as International Searching Authority for PCT/IB2017/000570 dated Jun. 30, 2017, (13 pages).
International Search Report and Written Opinion issued by the European Patent Office as International Searching Authority for PCT/IB2018/000434 dated Jun. 20, 2018, (14 pages).
International Search Report and Written Opinion issued in connection with PCT/IB2018/000886 dated Dec. 4, 2018, (13 pages).
International Search Report and Written Opinion issued in connection with PCT/IB2018/000907 dated Nov. 26, 2018, (11 pages).
International Search Report issued in connection with PCT/US/2009/054352 dated Mar. 12, 2010, (5 pages).
International Search Report issued in connection with PCT/US2008/077042 dated Mar. 13, 2009, (3 pages).
International Search Report issued in connection with PCT/US2009/031611 dated Jun. 3, 2009, (5 pages).
International Search Report issued in connection with PCT/US2009/061537 dated Jun. 7, 2010, (5 pages).
International Search Report issued in connection with PCT/US2009/066254 dated Feb. 24, 2010, (4 pages).
International Search Report issued in connection with PCT/US2013/033261 dated Jun. 14, 2013, (3 pages).
International Search Report issued in connection with PCT/US2013/033265 dated Jul. 9, 2013, (2 pages).
International Search Report issued in connection with PCT/US2013/033268 dated May 31, 2013, (2 pages).
Ioannis Ntzoufras "Bayesian Modeling Using Winbugs an Introduction", Department of Statistics, Athens University of Economics and Business, Wiley-Interscience, A John Wiley & Sons, Inc., Publication, Chapter 5, Jan. 1, 2007, pp. 155-220 (67 pages).
Japanese Office Action issued in Japanese Patent Application No. 2015-503396, dated Jun. 29, 2016, (7 pages).
Japanese Office Action issued in Japanese Patent Application No. 2016-159338, dated Oct. 11, 2017, (12 pages).
Japanese Office Action issued in Japanese Patent Application No. 2016-189126, dated Oct. 19, 2017, (24 pages).
Japanese Office Action issued in Japanese Patent Application No. 2017-514350, dated Dec. 5, 2018, (12 pages).
Japanese Office Action issued in Japanese Patent Application No. 2018-528305, dated Oct. 17, 2018, (6 pages).
Japanese Office Action issued in Japanese Patent Application No. 2018-528306, dated Dec. 20, 2018, (12 pages).
Japanese Office Action issued in Japanese Patent Application No. 2018-528314, dated Oct. 17, 2018, (5 pages).
Koole, G. et al., "An Overview of Routing and Staffing Algorithms in Multi-Skill Customer Contact Centers," Manuscript, Mar. 6, 2006, (42 pages).
Koole, G., "Performance Analysis and Optimization in Customer Contact Centers," Proceedings of the Quantitative Evaluation of Systems, First International Conference, Sep. 27-30, 2004, (4 pages).
Korean Notice of Preliminary Rejection issued in Korean Patent Application No. 10-2018-7036058, dated Apr. 22, 2019, (14 pages).
Nocedal, J. and Wright, S. J., "Numerical Optimization," Chapter 16 Quadratic Programming, 2006, pp. 448-496 (50 pages).
Ntzoufras, "Bayesian Modeling Using Winbugs". Wiley Interscience, Chapter 5, Normal Regression Models, Oct. 18, 2007, Redacted version, pp. 155-220 (67 pages).
Philippine Subsequent Substantive Examination Report issued in Philippine Patent Application No. 1-2010-501705, dated Jul. 14, 2014, (1 page).
Philippine Subsequent Substantive Examination Report issued in Philippine Patent Application No. 1-2011-500868, dated May 2, 2014, (1 page).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).
Riedmiller, M. et al., "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591 (8 pages).
Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).
Written Opinion of the International Searching Authority issued in connection with PCT/US/2009/054352 dated Mar. 12, 2010, (5 pages).
Written Opinion of the International Searching Authority issued in connection with PCT/US2008/077042 dated Mar. 13, 2009, (6 pages).
Written Opinion of the International Searching Authority issued in connection with PCT/US2009/031611 dated Jun. 3, 2009, (7 pages).
Written Opinion of the International Searching Authority issued in connection with PCT/US2009/061537 dated Jun. 7, 2010, (10 pages).
Written Opinion of the International Searching Authority issued in connection with PCT/US2009/066254 dated Feb. 24, 2010, (5 pages).
Written Opinion of the International Searching Authority issued in connection with PCT/US2013/033261 dated Jun. 14, 2013, (7 pages).
Written Opinion of the International Searching Authority issued in connection with PCT/US2013/033265 dated Jul. 9, 2013, (7 pages).
Written Opinion of the International Searching Authority issued in connection with PCT/US2013/033268 dated May 31, 2013, (7 pages).

* cited by examiner

TECHNIQUES FOR BEHAVIORAL PAIRING IN A TASK ASSIGNMENT SYSTEM

FIELD OF THE DISCLOSURE

The present disclosure generally relates to task assignment systems, more particularly, to techniques for behavioral pairing in a task assignment system.

BACKGROUND OF THE DISCLOSURE

A typical task assignment system algorithmically assigns tasks arriving at a task assignment center to agents available to handle those tasks. At times, the task assignment center may be in an "L1 state" and have agents available and waiting for assignment to tasks. At other times, the task assignment center may be in an "L2 state" and have tasks waiting in one or more queues for an agent to become available for assignment. At yet other times, the task assignment system may be in an "L3 state" and have multiple agents available and multiple tasks waiting for assignment. An example of a task assignment system is a contact center system that receives contacts (e.g., telephone calls, internet chat sessions, emails, etc.) to be assigned to agents.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

In other typical task assignment centers, a performance-based routing (PBR) strategy for prioritizing higher-performing agents for task assignment may be implemented. Under PBR, for example, the highest-performing agent among available agents receives the next available task. Other PBR and PBR-like strategies may make assignments using specific information about the agents.

"Behavioral Pairing" or "BP" strategies, for assigning tasks to agents, improve upon traditional assignment methods. BP targets balanced utilization of agents while simultaneously improving overall task assignment center performance potentially beyond what FIFO or PBR methods will achieve in practice.

When determining a BP model for a BP strategy, a task assignment system may consider information about its agents and incoming tasks or types of tasks. For example, a contact center system may consider the performance history of each agent, such as an agent's conversion rate in a sales queue, and it may consider customer information about a contact, such as the type of service a customer uses or how many years the customer has had a contract with the company, and other types of data found in a typical customer relationship management (CRM) system.

In some task assignment systems, it may be advantageous for a BP model to consider whether hold activities (e.g., types of music or specific hold music) favorably or unfavorably influence task outcomes. Thus, it may be understood that there may be a need for a BP model that takes into consideration historical information associated with hold activities, and a BP strategy that pairs a task with a preferred hold activity based on the BP model in order to optimize the overall performance of a task assignment system.

SUMMARY OF THE DISCLOSURE

Techniques for behavioral pairing in a task assignment system are disclosed. In one particular embodiment, the techniques may be realized as a method for behavioral pairing in a task assignment system comprising: determining, by at least one computer processor communicatively coupled to and configured to operate in the task assignment system, information about a task waiting for assignment in the task assignment system; and selecting, by the at least one computer processor, a hold activity from a plurality of hold activities for the task based on the information about the task, wherein the selected hold activity is expected to improve performance of the task assignment system.

In accordance with other aspects of this particular embodiment, the task assignment system may be a contact center system.

In accordance with other aspects of this particular embodiment, the plurality of hold activities may be a plurality of music recordings.

In accordance with other aspects of this particular embodiment, each music recording of the plurality of music recordings may be associated with at least one of a genre, an artist, a release date, and a beats-per-minute measurement.

In accordance with other aspects of this particular embodiment, the information about the task may include at least one of an account type, an account tenure, an age or age range, and a location associated with the task.

In accordance with other aspects of this particular embodiment, the selecting the hold activity may be based on a behavioral pairing model of preferred task-hold activity pairings.

In accordance with other aspects of this particular embodiment, the behavioral pairing model may have been determined using historical task-hold activity pairings outcome data.

In another particular embodiment, the techniques may be realized as a system for behavioral pairing in a task assignment system comprising at least one computer processor communicatively coupled to and configured to operate in the task assignment system, wherein the at least one computer processor is further configured to perform the steps in the above-described method.

In another particular embodiment, the techniques may be realized as an article of manufacture for behavioral pairing in a task assignment system comprising a non-transitory processor readable medium and instructions stored on the medium, wherein the instructions are configured to be readable from the medium by at least one computer processor communicatively coupled to and configured to operate in the contact center system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals.

These drawings should not be construed as limiting the present disclosure, but are intended to be illustrative only.

DETAILED DESCRIPTION

Figure 1:
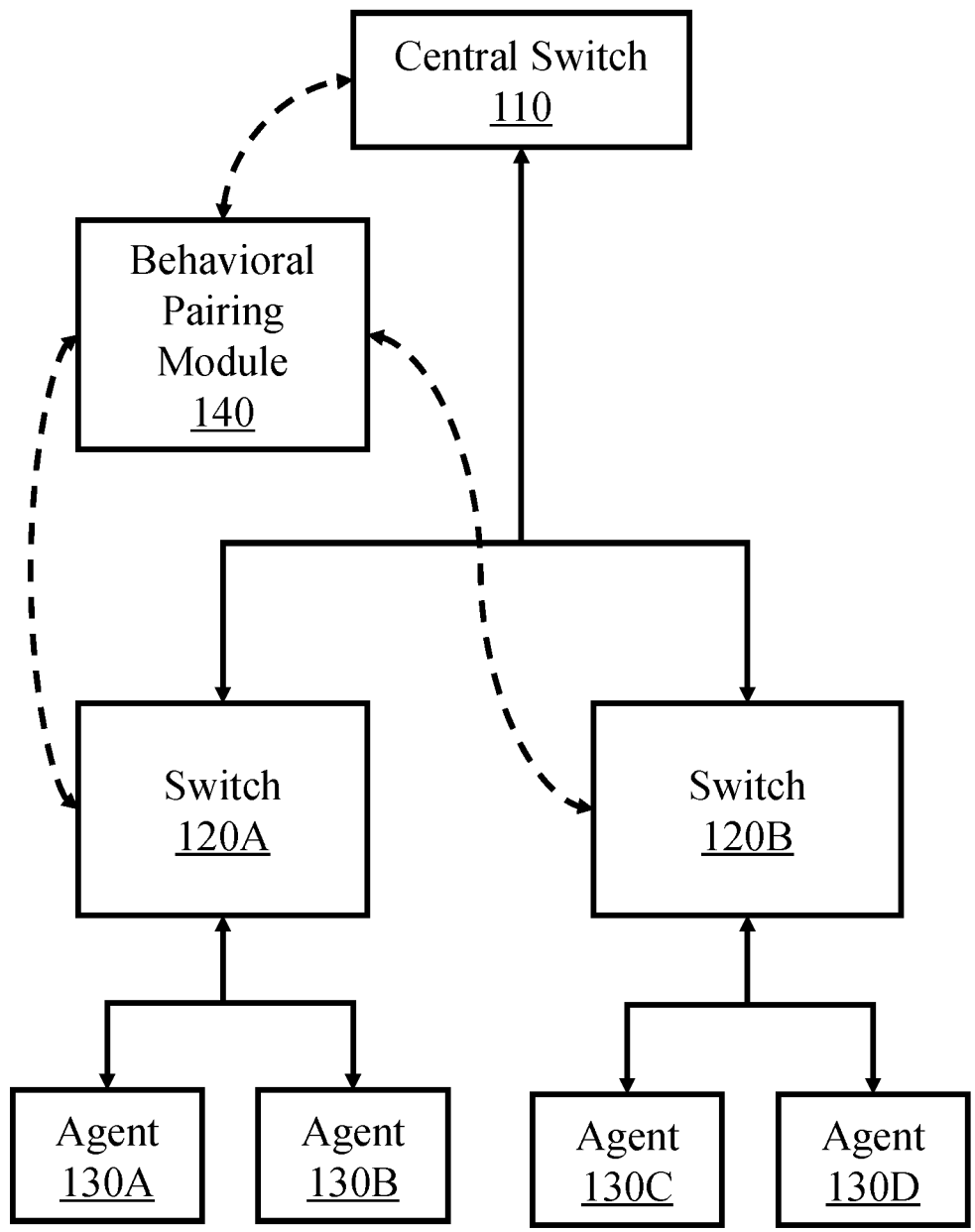
FIG. 1 shows a block diagram of a task assignment center according to embodiments of the present disclosure.

A typical task assignment system algorithmically assigns tasks arriving at a task assignment center to agents available to handle those tasks. At times, the task assignment center may be in an "L1 state" and have agents available and waiting for assignment to tasks. At other times, the task assignment center may be in an "L2 state" and have tasks waiting in one or more queues for an agent to become available for assignment. At yet other times, the task assignment system may be in an "L3 state" and have multiple agents available and multiple tasks waiting for assignment. An example of a task assignment system is a contact center system that receives contacts (e.g., telephone calls, internet chat sessions, emails, etc.) to be assigned to agents.

In some traditional task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent. In other traditional task assignment centers, a performance-based routing (PBR) strategy for prioritizing higher-performing agents for task assignment may be implemented. Under PBR, for example, the highest-performing agent among available agents receives the next available task.

The present disclosure refers to optimized strategies, such as "Behavioral Pairing" or "BP" strategies, for assigning tasks to agents that improve upon traditional assignment methods. BP targets balanced utilization of agents while simultaneously improving overall task assignment center performance potentially beyond what FIFO or PBR methods will achieve in practice. This is a remarkable achievement inasmuch as BP acts on the same tasks and same agents as FIFO or PBR methods, approximately balancing the utilization of agents as FIFO provides, while improving overall task assignment center performance beyond what either FIFO or PBR provide in practice. BP improves performance by assigning agent and task pairs in a fashion that takes into consideration the assignment of potential subsequent agent and task pairs such that, when the benefits of all assignments are aggregated, they may exceed those of FIFO and PBR strategies.

Various BP strategies may be used, such as a diagonal model BP strategy or a network flow BP strategy. These task assignment strategies and others are described in detail for a contact center context in, e.g., U.S. Pat. Nos. 9,300,802, 9,781,269, 9,787,841, and 9,930,180, all of which are hereby incorporated by reference herein. BP strategies may be applied in an L1 environment (agent surplus, one task; select among multiple available/idle agents), an L2 environment (task surplus, one available/idle agent; select among multiple tasks in queue), and an L3 environment (multiple agents and multiple tasks; select among pairing permutations).

When determining a BP model for a BP strategy, a task assignment system may consider information about its agents and incoming tasks or types of tasks. For example, a contact center system may consider the performance history of each agent, such as an agent's conversion rate in a sales queue, and it may consider customer information about a contact, such as the type of service a customer uses or how many years the customer has had a contract with the company, and other types of data found in a typical customer relationship management (CRM) system. As explained in detail below, embodiments of the present disclosure relates to a task assignment system that may account for historical information associated with hold activities in determining a BP model, and that may employ a BP strategy that pairs a task with a preferred hold activity based on the BP model in order to optimize its overall performance.

FIG. 1 shows a block diagram of a task assignment center 100 according to embodiments of the present disclosure. The description herein describes network elements, computers, and/or components of a system and method for pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment center 100 may include a central switch 110. The central switch 110 may receive incoming tasks (e.g., telephone calls, interne chat sessions, emails, etc.) or support outbound connections to contacts via a dialer, a telecommunications network, or other modules (not shown). The central switch 110 may include routing hardware and software for helping to route tasks among one or more subcenters, or to one or more Private Branch Exchange ("PBX") or Automatic Call Distribution (ACD) routing components or other queuing or switching components within the task assignment center 100. The central switch 110 may not be necessary if there is only one subcenter, or if there is only one PBX or ACD routing component in the task assignment center 100.

If more than one subcenter is part of the task assignment center 100, each subcenter may include at least one switch (e.g., switches 120A and 120B). The switches 120A and 120B may be communicatively coupled to the central switch 110. Each switch for each subcenter may be communicatively coupled to a plurality (or "pool") of agents. Each switch may support a certain number of agents (or "seats") to be logged in at one time. At any given time, a logged-in agent may be available and waiting to be connected to a task, or the logged-in agent may be unavailable for any of a number of reasons, such as being connected to another contact, performing certain post-call functions such as logging information about the call, or taking a break. In the example of FIG. 1, the central switch 110 routes tasks to one of two subcenters via switch 120A and switch 120B, respectively. Each of the switches 120A and 120B is shown with two agents. Agents 130A and 130B may be logged into switch 120A, and agents 130C and 130D may be logged into switch 120B.

The task assignment center 100 may also be communicatively coupled to an integrated pairing strategy service from, for example, a third-party vendor. In the example of FIG. 1, behavioral pairing module 140 may be communicatively coupled to one or more switches in the switch system of the task assignment center 100, such as central switch 110, switch 120A, and switch 120B. In some embodiments, switches of the task assignment center 100 may be communicatively coupled to multiple behavioral pairing modules. In some embodiments, behavioral pairing module 140 may be embedded within a component of the task assignment center 100 (e.g., embedded in or otherwise integrated with a switch).

Behavioral pairing module 140 may receive information from a switch (e.g., switch 120A) about agents logged into the switch (e.g., agents 130A and 130B) and about incoming tasks via another switch (e.g., central switch 110) or, in some embodiments, from a network (e.g., the Internet or a telecommunications network) (not shown). The behavioral pairing module 140 may process this information to determine which tasks should be paired (e.g., matched, assigned, distributed, routed) with which agents.

For example, in an L1 state, multiple agents may be available and waiting for connection to a contact, and a task arrives at the task assignment center 100 via a network or the central switch 110. As explained above, without the behavioral pairing module 140, a switch will typically automatically distribute the new task to whichever available agent has been waiting the longest amount of time for a task under a FIFO strategy, or whichever available agent has been determined to be the highest-performing agent under a PBR strategy. With a behavioral pairing module 140, contacts and agents may be given scores (e.g., percentiles or percentile ranges/bandwidths) according to a pairing model or other artificial intelligence data model, so that a task may be matched, paired, or otherwise connected to a preferred agent.

In an L2 state, multiple tasks are available and waiting for connection to an agent, and an agent becomes available. These tasks may be queued in a switch such as a PBX or ACD device. Without the behavioral pairing module 140, a switch will typically connect the newly available agent to whichever task has been waiting on hold in the queue for the longest amount of time as in a FIFO strategy or a PBR strategy when agent choice is not available. In some task assignment centers, priority queuing may also be incorporated, as previously explained. With a behavioral pairing module 140 in this L2 scenario, as in the L1 state described above, tasks and agents may be given percentiles (or percentile ranges/bandwidths, etc.) according to, for example, a model, such as an artificial intelligence model, so that an agent becoming available may be matched, paired, or otherwise connected to a preferred task.

Figure 2:
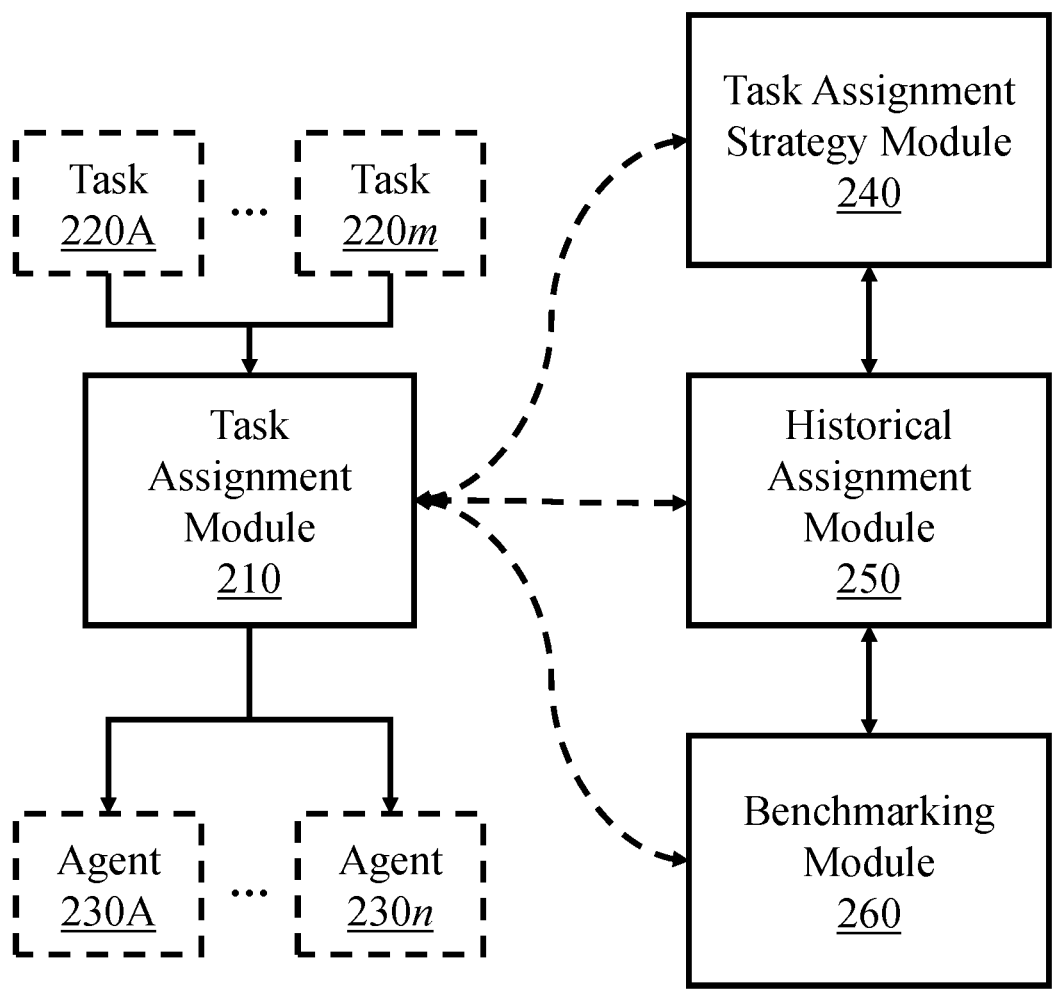
FIG. 2 shows a block diagram of a task assignment system according to embodiments of the present disclosure.

FIG. 2 shows a block diagram of a task assignment system 200 according to embodiments of the present disclosure. The task assignment system 200 may be included in a task assignment center (e.g., task assignment center 100) or incorporated in a component or module (e.g., behavioral pairing module 140) of a task assignment center for helping to assign tasks among various agents.

The task assignment system 200 may include a task assignment module 210 that is configured to pair (e.g., match, assign) incoming tasks to available agents. In the example of FIG. 2, m tasks 220A-220m are received over a given period, and n agents 230A-230n are available during the given period. Each of the m tasks may be assigned to one of the n agents for servicing or other types of task processing. In the example of FIG. 2, m and n may be arbitrarily large finite integers greater than or equal to one. In a real-world task assignment center, such as a contact center, there may be dozens, hundreds, etc. of agents logged into the contact center to interact with contacts during a shift, and the contact center may receive dozens, hundreds, thousands, etc. of contacts (e.g., telephone calls, internet chat sessions, emails, etc.) during the shift.

In some embodiments, a task assignment strategy module 240 may be communicatively coupled to and/or configured to operate in the task assignment system 200. The task assignment strategy module 240 may implement one or more task assignment strategies (or "pairing strategies") for assigning individual tasks to individual agents (e.g., pairing contacts with contact center agents). A variety of different task assignment strategies may be devised and implemented by the task assignment strategy module 240. In some embodiments, a FIFO strategy may be implemented in which, for example, the longest-waiting agent receives the next available task (in L1 environments) or the longest-waiting task is assigned to the next available agent (in L2 environments). In other embodiments, a PBR strategy for prioritizing higher-performing agents for task assignment may be implemented. Under PBR, for example, the highest-performing agent among available agents receives the next available task. In yet other embodiments, a BP strategy may be used for optimally assigning tasks to agents using information about either tasks or agents, or both. Various BP strategies may be used, such as a diagonal model BP strategy or a network flow BP strategy. See U.S. Pat. Nos. 9,300,802, 9,781,269, 9,787,841, and 9,930,180.

In some embodiments, a historical assignment module 250 may be communicatively coupled to and/or configured to operate in the task assignment system 200 via other modules such as the task assignment module 210 and/or the task assignment strategy module 240. The historical assignment module 250 may be responsible for various functions such as monitoring, storing, retrieving, and/or outputting information about task-agent assignments that have already been made. For example, the historical assignment module 250 may monitor the task assignment module 210 to collect information about task assignments in a given period. Each record of a historical task assignment may include information such as an agent identifier, a task or task type identifier, offer or offer set identifier, outcome information, or a pairing strategy identifier (i.e., an identifier indicating whether a task assignment was made using a BP strategy, a BP strategy, or some other pairing strategy such as a FIFO or PBR pairing strategy).

In some embodiments and for some contexts, additional information may be stored. For example, in a call center context, the historical assignment module 250 may also store information about the time a call started, the time a call ended, the phone number dialed, and the caller's phone number. For another example, in a dispatch center (e.g., "truck roll") context, the historical assignment module 250 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 250 may generate a pairing model, a BP model, or similar computer processor-generated model based on a set of historical assignments for a period of time (e.g., the past week, the past month, the past year, etc.), which may be used by the task assignment strategy module 240 to make task assignment recommendations or instructions to the task assignment module 210.

In some embodiments, the historical assignment module 250 may generate a BP model based on historical pairings between tasks and hold activities, and the corresponding outcomes of the pairings. For example, in a call center context, when a caller calls a service provider to reconcile a billing issue, cancel service, report a customer support issue, buy an additional device or service, inquire about a new accessory, etc., the caller is usually guided through a series of options leveraging a technology known as an interactive voice response (IVR) system. Once the caller makes her selections to get to an appropriate queue from which she will be getting assistance, the IVR system may stream a music recording selected randomly from a library or a catalog in a media server component of the IVR system platform. Each music recording may be tagged with metadata that describes the underlying components of the music recording that was played while the caller was waiting on hold. The metadata may include a genre, artist, date of the original recording's release, beats per minute, etc. associated with the music recording.

IVR data may be used to inform a BP model and BP strategy to understand the intent of a caller (e.g., billing inquiry, technical support, sales, upgrades, cancel service, etc.) and optimally pair the caller with the highest performing hold music while the caller waits to talk to a call center agent. For example, the historical assignment module 250 may join metadata of music recordings to historical task-agent pairing outcome data, as well as CRM data and third-party data, in order to model the effect of the music recordings on the task-agent pairing outcomes. The CRM data and third-party data may include, for each caller, a location (e.g., billing address or ZIP code), an age or age range, a credit score range, an income level, an account type (e.g., prepaid, single account, post-paid family account), a tenure, a device type, etc. Thus, based on a BP model informed of historical task-hold activity pairings from the historical assignment module 250, the task assignment strategy module 240 may apply a BP strategy to select an optimal hold activity (e.g., a music recording of specific genre, artist, beats per minute, etc.) for a given caller/task.

In some embodiments, a benchmarking module 260 may be communicatively coupled to and/or configured to operate in the task assignment system 200 via other modules such as the task assignment module 210 and/or the historical assignment module 250. The benchmarking module 260 may benchmark the relative performance of two or more pairing strategies (e.g., FIFO, PBR, BP, etc.) using historical assignment information, which may be received from, for example, the historical assignment module 250. In some embodiments, the benchmarking module 260 may perform other functions, such as establishing a benchmarking schedule for cycling among various pairing strategies, tracking cohorts (e.g., base and measurement groups of historical assignments), etc. Benchmarking is described in detail for the contact center context in, e.g., U.S. Pat. No. 9,712,676, which is hereby incorporated by reference herein.

In some embodiments, the benchmarking module 260 may benchmark the relative performance of a BP strategy that allows for random hold activities (e.g., music recordings) and a BP strategy that optimally selects a hold activity for a given task based on a BP model informed of historical task-hold activity pairings. For example, the benchmarking module 260 may find that, when retention callers aged 35-55 from the East Coast of the United States are played reggae music with 70-80 beats per minute (e.g., Bob Marley's "Three Little Birds" song), there is a 1.5% increase in retention. As another example, the benchmarking module 260 may find that, when accessory sales callers aged 17-32 from the Midwest of the United States are played higher energy alternative rock with 135-150 beats per minute (e.g., U2's "Vertigo" song), accessory sales have an 3.2% increase in revenue.

In some embodiments, the benchmarking module 260 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 200 while it was optimized or otherwise configured to use one task assignment strategy instead of another.

Figure 3:
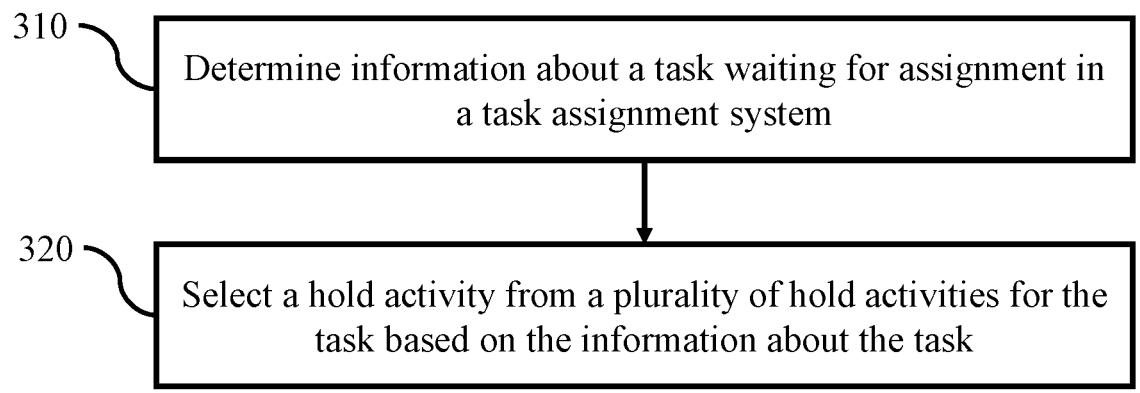
FIG. 3 shows a flow diagram of a task assignment method according to embodiments of the present disclosure.

FIG. 3 shows a task assignment method 300 according to embodiments of the present disclosure. The task assignment method 300 may be for BP in a task assignment system (e.g., task assignment system 200). Task assignment method 300 may begin at block 310. At block 310, the task assignment method 300 may determine information about a task waiting for assignment in a task assignment system. For example, in the context of a call center, the information about the task may include CRM data and third-party data a location (e.g., billing address or ZIP code), an age or age range, a credit score range, an income level, an account type, a tenure, a device type, etc. associated with a caller.

At block 320, the task assignment method 300 may select a hold activity from a plurality of hold activities for the task based on the information about the task. For example, in the context of a call center, based on the information associated with a caller, the task assignment method may apply a BP strategy with a BP model of preferred task-hold activity pairings to select an optimal hold activity (e.g., a music recording) for the caller, such that the overall performance of the task assignment system (i.e., the call center) is improved.

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing in a task assignment system comprising:
   determining, by at least one computer processor communicatively coupled to and configured to operate in the task assignment system, information about a task waiting for assignment in the task assignment system;
   determining, by the at least one computer processor, a highest-performing hold activity from a plurality of hold activities for the task based on information about the task and a plurality of historical task-hold activity pairings; and
   selecting, by the at least one computer processor, the highest-performing hold activity from the plurality of hold activities for the task, wherein the selected hold activity is expected to improve performance of the task assignment system for a task-agent pairing involving the task, wherein the task and the task-agent pairing are otherwise unrelated to the highest-performing hold activity.

2. The method of claim 1, wherein the task assignment system is a contact center system.

3. The method of claim 1, wherein the plurality of hold activities is a plurality of music recordings.

4. The method of claim 3, wherein each music recording of the plurality of music recordings is associated with at least one of a genre, an artist, a release date, and a beats-per-minute measurement.

5. The method of claim 1, wherein the information about the task includes at least one of an account type, an account tenure, an age or age range, and a location associated with the task.

6. The method of claim 1, wherein determining the highest-performing hold activity is further based on a behavioral pairing model of preferred task-hold activity pairings.

7. The method of claim 6, wherein the behavioral pairing model is determined using historical task-hold activity pairings outcome data.

8. A system for behavioral pairing in a task assignment system comprising:
   at least one computer processor communicatively coupled to and configured to operate in the task assignment system, wherein the at least one computer processor is further configured to:
      determine information about a task waiting for assignment in the task assignment system;
      determine a highest-performing hold activity from a plurality of hold activities for the task based on information about the task and a plurality of historical task-hold activity pairings; and
      select the highest-performing hold activity from the plurality of hold activities for the task, wherein the selected hold activity is expected to improve performance of the task assignment system for a task-agent pairing involving the task, wherein the task and the task-agent pairing are otherwise unrelated to the highest-performing hold activity.

9. The system of claim 8, wherein the task assignment system is a contact center system.

10. The system of claim 8, wherein the plurality of hold activities is a plurality of music recordings.

11. The system of claim 10, wherein each music recording of the plurality of music recordings is associated with at least one of a genre, an artist, a release date, and a beats-per-minute measurement.

12. The system of claim 8, wherein the information about the task includes at least one of an account type, an account tenure, an age or age range, and a location associated with the task.

13. The system of claim 8, wherein the at least one computer processor is further configured to determine the highest-performing hold activity based on a behavioral pairing model of preferred task-hold activity pairings.

14. The system of claim 13, wherein the behavioral pairing model is determined using historical task-hold activity pairings outcome data.

15. An article of manufacture for behavioral pairing in a task assignment system comprising:
   a non-transitory processor readable medium; and
   instructions stored on the medium;
   wherein the instructions are configured to be readable from the medium by at least one computer processor communicatively coupled to and configured to operate in the task assignment system and thereby cause the at least one computer processor to operate so as to:
      determine information about a task waiting for assignment in the task assignment system;
      determine a highest-performing hold activity from a plurality of hold activities for the task based on information about the task and a plurality of historical task-hold activity pairings; and
      select the highest-performing hold activity from the plurality of hold activities for the task, wherein the selected hold activity is expected to improve performance of the task assignment system for a task-agent pairing involving the task, wherein the task and the task-agent pairing are otherwise unrelated to the highest-performing hold activity.

16. The article of manufacture of claim 15, wherein the task assignment system is a contact center system.

17. The article of manufacture of claim 15, wherein the plurality of hold activities is a plurality of music recordings.

18. The article of manufacture of claim 17, wherein each music recording of the plurality of music recordings is associated with at least one of a genre, an artist, a release date, and a beats-per-minute measurement.

19. The article of manufacture of claim 15, wherein the information about the task includes at least one of an account type, an account tenure, an age or age range, and a location associated with the task.

20. The article of manufacture of claim 15, wherein the instructions are further configured to cause the at least one computer processor to operate so as to determine the highest-performing hold activity based on a behavioral pairing model of preferred task-hold activity pairings.

21. The article of manufacture of claim 20, wherein the behavioral pairing model is determined using historical task-hold activity pairings outcome data.

22. The method of claim 1, wherein determining the highest-performing hold activity comprises:
- determining a plurality of task-agent pairing outcomes for historical task-hold activity pairings;
- associating each task-agent pairing outcome of the plurality of outcomes with at least one hold activity in the plurality of hold activities;
- determining at least one task-agent pairing outcome based on the information about the task; and
- selecting a hold activity associated with the at least one task-agent pairing outcome as the highest-performing hold activity.

23. The system of claim 8, wherein the at least one computer processor is further configured to determine the highest-performing hold activity by:
- determining a plurality of task-agent pairing outcomes for historical task-hold activity pairings;
- associating each task-agent pairing outcome of the plurality of outcomes with at least one hold activity in the plurality of hold activities;
- determining at least one task-agent pairing outcome based on the information about the task; and
- selecting a hold activity associated with the at least one task-agent pairing outcome as the highest-performing hold activity.

24. The article of manufacture of claim 15, wherein the instructions are further configured to cause the at least one computer processor to operate so as to determine the highest-performing hold activity by:
- determining a plurality of task-agent pairing outcomes for historical task-hold activity pairings;
- associating each task-agent pairing outcome of the plurality of outcomes with at least one hold activity in the plurality of hold activities;
- determining at least one task-agent pairing outcome based on the information about the task; and
- selecting a hold activity associated with the at least one task-agent pairing outcome as the highest-performing hold activity.

* * * * *